US008064745B2

(12) United States Patent
Fortusini et al.

(10) Patent No.: US 8,064,745 B2
(45) Date of Patent: Nov. 22, 2011

(54) PLANAR WAVEGUIDE AND OPTICAL FIBER COUPLING

(75) Inventors: Davide Domenico Fortusini, Ithaca, NY (US); Vitor Marino Schneider, Painted Post, NY (US); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/624,847

(22) Filed: Nov. 24, 2009

(65) Prior Publication Data
US 2011/0142395 A1   Jun. 16, 2011

(51) Int. Cl.
*G02B 6/34* (2006.01)

(52) U.S. Cl. ............. 385/37; 385/52; 385/27; 385/31; 385/88; 385/43; 385/49; 385/129; 385/131

(58) Field of Classification Search .......... 385/14, 385/25, 26, 27, 28, 31, 37, 33, 49, 50, 88, 385/89, 92, 93, 94, 129, 130, 1, 132, 43, 385/52
See application file for complete search history.

(56) References Cited

U.S. PATENT DOCUMENTS

| 3,864,016 | A | 2/1975 | Dakss et al. | 350/96 |
| 4,018,506 | A | 4/1977 | Hammer | 350/96 C |
| 4,911,516 | A * | 3/1990 | Palfrey et al. | 385/37 |
| 5,101,459 | A | 3/1992 | Sunagawa | 385/37 |
| 5,469,518 | A | 11/1995 | Song et al. | 385/89 |
| 5,926,496 | A | 7/1999 | Ho et al. | 372/92 |
| 6,285,813 | B1 | 9/2001 | Schultz et al. | 385/37 |
| 6,944,377 | B2 * | 9/2005 | Umebayshi et al. | 385/49 |
| 7,043,133 | B2 | 5/2006 | Johnson et al. | 385/142 |
| 7,162,124 | B1 | 1/2007 | Gunn, III et al. | 385/37 |
| 7,184,625 | B2 | 2/2007 | Gunn, III et al. | 385/37 |
| 7,194,166 | B1 | 3/2007 | Gunn, III | 385/37 |
| 7,245,803 | B2 | 7/2007 | Gunn, III et al. | 385/37 |
| 7,251,386 | B1 | 7/2007 | Dickinson et al. | 385/14 |
| 7,260,289 | B1 | 8/2007 | Gunn, III et al. | 385/37 |
| 7,366,380 | B1 | 4/2008 | Peterson et al. | 385/47 |
| 7,378,861 | B1 | 5/2008 | Malendevich et al. | 324/758 |
| 7,412,170 | B1 | 8/2008 | Louderback et al. | 398/79 |
| 7,428,358 | B2 * | 9/2008 | Lu et al. | 385/49 |
| 7,433,563 | B2 * | 10/2008 | Kennedy et al. | 385/49 |
| 2001/0009594 | A1 | 7/2001 | Hosoi | 385/2 |
| 2002/0067882 | A1 | 6/2002 | Guilfoyle | 385/24 |

(Continued)

FOREIGN PATENT DOCUMENTS

JP   1988314472   12/1988
JP   1994051144   2/1994

OTHER PUBLICATIONS

Roelkens et al; "Efficient Silicon-On-Insulator fiber coupler fabricated using 248nm deep UV lithography"; IEEE Photonics Technology Letters; vol. 17, Issue 12, pp. 2613-2615; Dec. 2005.

(Continued)

*Primary Examiner* — Brian Healy
(74) *Attorney, Agent, or Firm* — Matthew J. Mason

(57) ABSTRACT

An apparatus for optically coupling light between optical transmission components is provided. The apparatus includes first and second optical transmission components wherein the first optical transmission component includes a planar optical waveguide, a grating coupler, and a transparent substrate and the second optical transmission component includes an optical fiber. Preferably, the planar optical waveguide includes silicon and the transparent substrate includes glass. Methods for coupling light between optical transmission components are also provided.

25 Claims, 12 Drawing Sheets

U.S. PATENT DOCUMENTS

| | | |
|---|---|---|
| 2003/0228088 A1 | 12/2003 | Liu .................................. 385/16 |
| 2004/0146431 A1 | 7/2004 | Scherer et al. ............. 422/82.05 |
| 2004/0184156 A1 | 9/2004 | Gunn, III et al. .............. 359/629 |
| 2004/0239869 A1* | 12/2004 | Cavanaugh et al. ........... 349/198 |
| 2006/0067617 A1* | 3/2006 | Gaylord et al. ................. 385/37 |
| 2007/0263973 A1 | 11/2007 | Van Laere et al. ............. 385/129 |
| 2011/0142395 A1* | 6/2011 | Fortusini et al. ................. 385/37 |

OTHER PUBLICATIONS

Lifeng et al; "Effects of beam coupling on the efficiency of planar waveguide grating couplers"; Applied Optics, vol. 29, No. 36, pp. 5320-5325; Dec. 20, 1990.

Vivien et al; "Light injection in SOI microwaveguides using high-efficiency grating couplers"; Journal of Lightwave Technology, vol. 24, No. 10, pp. 3810-3815; Oct. 2006.

Taillaert, et al; "An out-of-plane grating coupler for efficient butt-coupling between compact planar waveguides and single-mode fibers"; IEEE Journal of Quantum Electronics; vol. 38, Issue 7, pp. 949-955; Jul. 2002.

Orobtchouk et al; "High-efficiency light coupling in a submicrometric silicon-on-insulator waveguide"; Applied Optics, vol. 39, No. 31, pp. 5773-5777, Nov. 1, 2000.

Scheerlinck et al; "Vertical fiber-to-waveguide coupling using adapated fibers with an angled facet fabricated by a simple molding technique"; Applied Optics, vol. 47; No. 18, pp. 3241-3245; Jun. 20, 2008.

Pignuet et al; "Monolithically integrated high-speed CMOS photonic transceivers"; Group IV Photonics; 2008 5$^{th}$ IEEE International Conference on Group IV Photonics; pp. 362-362, Sep. 2008.

* cited by examiner

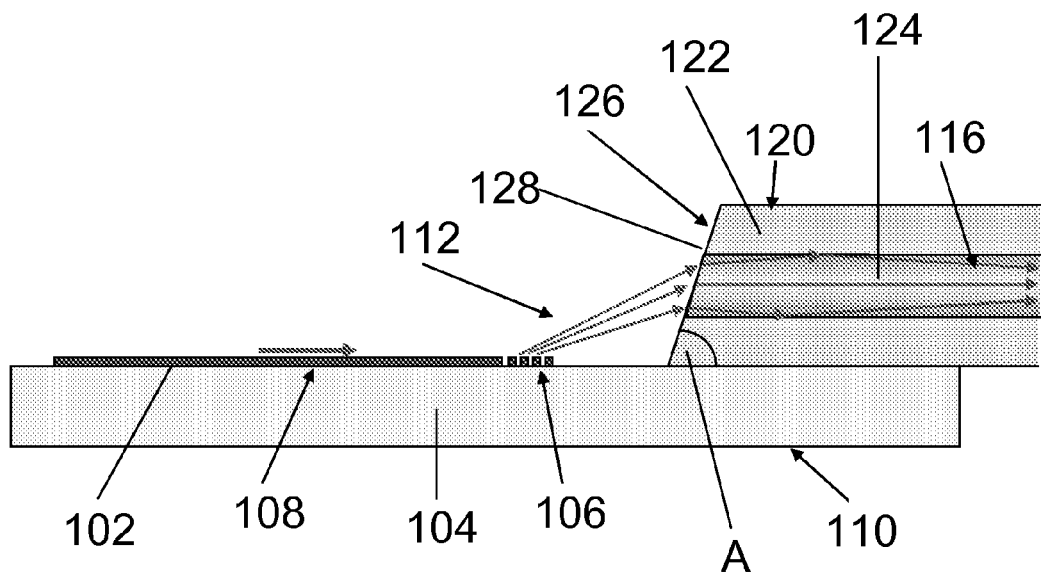
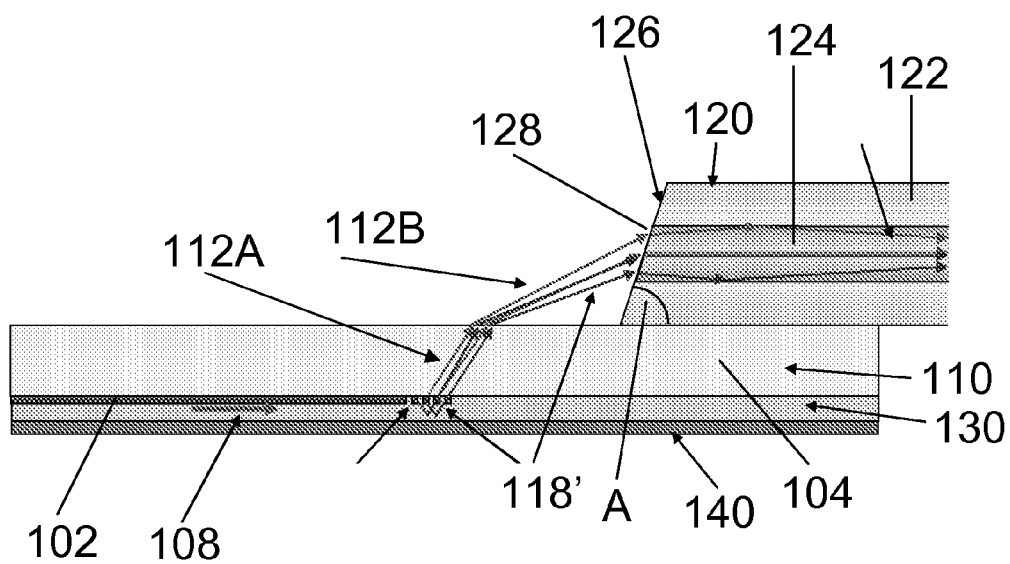

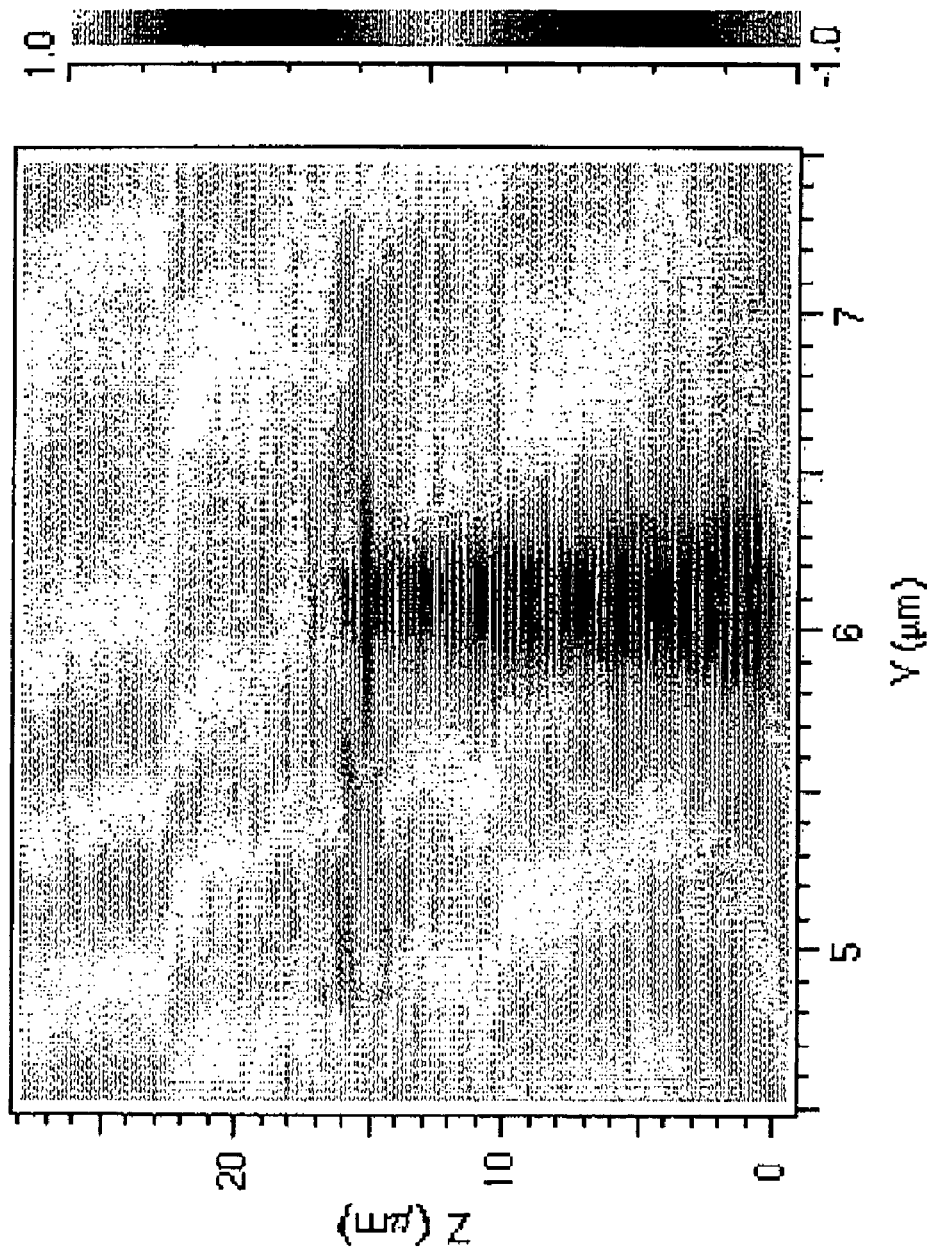

PLANAR WAVEGUIDE AND OPTICAL FIBER COUPLING

BACKGROUND

The disclosure relates generally to optical coupling between a planar optical waveguide and an optical fiber, and particularly to optical coupling between a planar optical waveguide on a transparent substrate and an angle cleaved optical fiber using a grating coupler where the optical fiber axis is generally parallel to the substrate plane.

Low-cost optical links for short distance applications (<1 km) often employ multimode optical fiber for relaxed alignment tolerances to sources and detectors. The large size of the multimode fiber core makes the optical interconnections highly tolerant of lateral, angular and axial misalignments with respect to commonly used Fabry-Perot or VCSEL laser sources and broad area detectors. This approach is well-suited for low to moderate data rate applications where link signaling is carried out using a single optical wavelength.

When higher link bandwidth performance is required, it is desirable to multiplex multiple signals on a single optical fiber using WDM (wavelength division multiplexing). This approach is appropriate both in short link applications to avoid length-bandwidth limitations inherent to multimode fibers, as well as in longer link applications that employ single mode fiber. In these cases, wavelength multiplex (MUX) and wavelength demultiplex (DEMUX) operations are generally required at source and receiver ends of the link, respectively.

Planar lightwave circuits (PLCs) are well-suited for carrying out optical MUX and DEMUX operations. High index contrast waveguides enable implementation of tight waveguide bends with low optical loss. This allows fabrication of compact MUX and DEMUX devices on small chips, reducing chip cost and reducing overall package size. For example, MUX and DEMUX operations may be carried out using IIR (Infinite Impulse Response) ring resonator filter devices that are easily tuned to operate on specific wavelengths. Other devices, such as switches, modulators and power splitters may also be implemented using PLCs, extending the platform to other link and network applications.

While it is relatively straightforward to butt couple a multimode fiber to a high index contrast PLC waveguide at the chip edge, this interconnection is not always practical or desirable because it requires the coupling to occur at the edge of the chip, which creates a constraint on the layout of the PLC, and it places limitations on making the chip hermetically sealed. The lensed multimode fibers and single-mode fibers generally used in this application require precision alignment for low-loss coupling to PLC waveguides.

One approach for fiber coupling into PLC waveguides involves grating coupler devices. The grating coupler is typically implemented a broad taper shape to capture light incident on the coupler from an optical fiber and guide it along a PLC waveguide. The optical fiber is typically arranged to be generally normal or perpendicular to the PLC substrate. The same device can operate in reverse to launch light from a PLC waveguide into an optical fiber.

SUMMARY

One embodiment includes an apparatus for optically coupling light between optical transmission components. The apparatus includes a first optical transmission component and a second optical transmission component. The first optical transmission component includes a planar optical waveguide extending along a longitudinal path, a grating coupler, and a transparent substrate. The transparent substrate is disposed on a side of the planar optical waveguide and the grating coupler. The second optical transmission component includes an optical fiber. The optical fiber extends along a longitudinal axis and includes a core and a cladding and having an angled tip. The longitudinal axis of the optical fiber is substantially parallel to the longitudinal path of the planar optical waveguide.

Another embodiment includes a method of optically coupling light between optical transmission components. The method includes transmitting light between a first optical transmission component and a second optical transmission component. The first optical transmission component includes a planar optical waveguide extending along a longitudinal path, a grating coupler, and a transparent substrate. The transparent substrate is disposed on a side of the planar optical waveguide and the grating coupler. The second optical transmission component includes an optical fiber. The optical fiber extends along a longitudinal axis and includes a core and a cladding and having an angled tip. The longitudinal axis of the optical fiber is substantially parallel to the longitudinal path of the planar optical waveguide. Light is transmitted between the planar optical waveguide, the grating coupler, and the core of the optical fiber.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present exemplary embodiments, and are intended to provide an overview or framework for understanding the nature and character of the claims. The accompanying drawings are included to provide a further understanding, and are incorporated into and constitute a part of this specification. The drawings illustrate various embodiments, and together with the description serve to explain the principles and operations of the various embodiments.

BRIEF DESCRIPTION OF THE DRAWINGS

FIG. 5 illustrates a side cutaway view of another embodiment of a planar optical waveguide optically coupled to an optical fiber as described herein;

FIG. 6 illustrates a side cutaway view of another embodiment of a planar optical waveguide optically coupled to an optical fiber as described herein;

FIGS. 12A-12C illustrate finite difference time domain (FDTD) simulations of the grating couplers illustrated in FIG. 11;

DETAILED DESCRIPTION

Reference will now be made in detail to the present preferred embodiments, examples of which are illustrated in the accompanying drawings.

Figure 1:
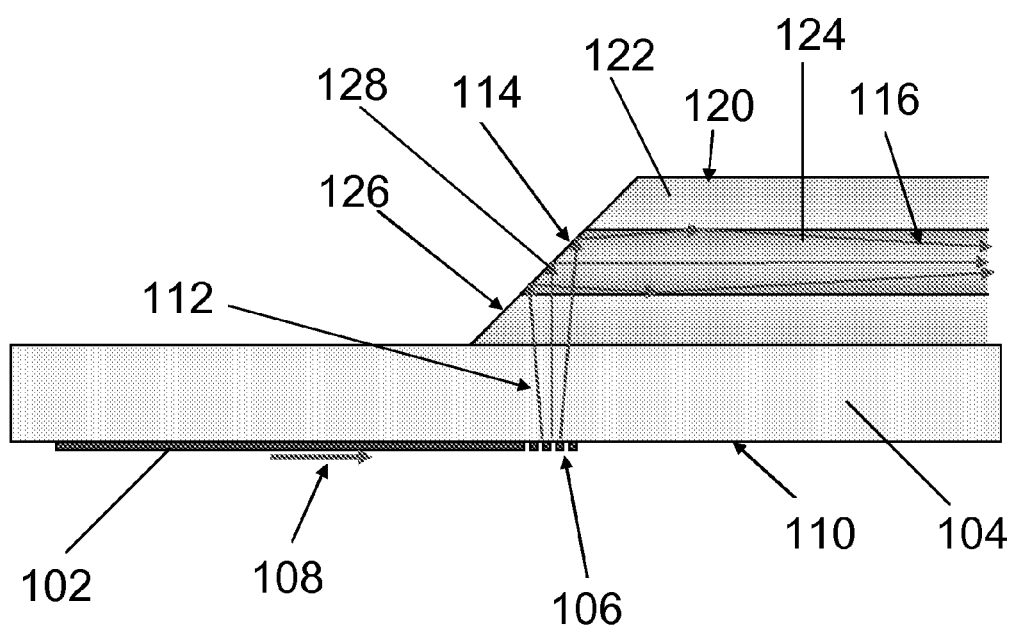
FIG. 1 illustrates a side cutaway view of an embodiment of a planar optical waveguide optically coupled to an optical fiber as disclosed herein.

FIG. 1 illustrates a side cutaway view of an embodiment of a planar optical waveguide 102 optically coupled to an optical fiber 120. Optical fiber 120 can be a single mode fiber or a multimode fiber. Planar optical waveguide 102 extends along the bottom surface of a transparent substrate 104 along a longitudinal path. Light is propagated along planar optical waveguide 102 as shown by arrow 108 until reaching grating coupler 106. Grating coupler 106 then redirects light vertically through transparent substrate 104 as indicated by arrows 112, through cladding 122 of optical fiber 120, and into core 124 of optical fiber 120. In the embodiment illustrated in FIG. 1, planar optical waveguide 102, grating coupler 106, and transparent substrate 104 combine to form a first optical transmission component 110. In the embodiment illustrated in FIG. 1, optical fiber 120 acts as a second optical transmission component. Optical fiber 120 extends along a longitudinal axis and includes a core 124, cladding 122, and an end having an angled tip 126. The end having angled tip 126 includes angled face 128. As shown by 114, light 112 is reflected by angled face 128 so that it is redirected along core 124 of optical fiber 120 as indicated by arrows 116. As can be seen from FIG. 1, longitudinal axis of optical fiber 120 is substantially parallel to the longitudinal path of planar optical waveguide 102.

Optical fiber 120 is preferably a multimode optical fiber. Preferably, the diameter of core of optical fiber 120 is at least 40 μm, such as at least 50 μm, including optical fiber having a core diameter of between 50 and 62.5 μm.

Angled tip 126, including angled face 128, may be fabricated, for example, by laser cleaving methods, by precision mechanical fiber cleaving methods, or by mechanical polishing methods known to those skilled in the art.

As used herein, the term "transparent" is used to refer to a solid material in which at least 70% of the radiation at the wavelength of operation that penetrates the material is transmitted through the material as opposed to being absorbed or scattered by the material. Particularly preferred transparent materials include those in which at least 90% of the radiation at the wavelength of operation that penetrates the material is transmitted through the material as opposed to being absorbed or scattered by the material.

While not limited, a preferred material for the transparent substrate is glass, such as substantially pure SiO₂ or a borosilicate glass such as Corning® code 1737 glass. Other preferred materials for the transparent substrate include glass ceramics and other ceramics that are transparent (as defined above) in the range from visible to near infrared wavelengths (e.g., about 400 nm to about 1700 nm in wavelength).

While not limited, a preferred material for planar optical waveguide is silicon (Si). Other preferred materials include germanium (Ge), silicon-germanium (SiGe), and silicon carbide (SiC).

As used herein, the term "reflective" is used to refer to a solid material surface at which at least 25% of the optical power at the wavelength of operation that impinges on the surface is reflected by the surface.

As used herein, the term "partially reflective" is used to refer to a solid material surface at which at least 1% of the radiation at the wavelength of operation that impinges on the surface is reflected by the surface.

Planar optical waveguide 102 can be patterned or formed on transparent substrate 104 using techniques that are known to those skilled in the art. For example, planar optical waveguide 102 can be patterned on transparent substrate 104 using photolithographic processes that are known to those skilled in the art. Such photolithographic processes can also be used to form grating coupler 106. While the side cutaway view of FIG. 1 illustrates one planar optical waveguide 102 and one grating coupler 106, it is to be understood that a plurality of planar optical waveguides and grating couplers may be patterned or formed on a single transparent substrate 104. An optical fiber can then be optically coupled to each planar optical waveguide in a manner similar to that illustrated in FIG. 1. In such manner, an array of optical fibers can be optically coupled to an array of planar optical waveguides.

As illustrated in FIG. 1, transparent substrate 104 is disposed between planar optical waveguide 102 and optical fiber 120 so that light is directed from grating coupler 106, through transparent substrate 104 to core 124 of optical fiber 120. Put another way, planar optical waveguide 102 is disposed on a side of transparent substrate 104 that is opposite to that of optical fiber 120. This configuration allows the transparent substrate 104 to protect grating coupler 106 from damage, such as during alignment with optical fiber 120. In addition, transparent substrate can provide mechanical support for angled tip 126 of optical fiber 120, which can also allow for more precise and stable positioning of optical fiber 120 relative to grating coupler 106. Moreover, depending on the design of the optical interconnection, the surface of transparent substrate 104 proximate to optical fiber 120 may be cleaned or otherwise treated without causing damage to planar optical waveguide 102 or grating coupler 106. Also, transparent substrate 104 may serve as a hermetic barrier to protect any active devices that are on the same side of transparent substrate as planar optical waveguide 102, such as those that are interconnected to planar optical waveguide 102.

While not shown in FIG. 1, transparent substrate 104 may be patterned with an alignment feature, such as a groove that is aligned with the longitudinal axis of optical fiber 120. Besides acting as an alignment feature, a groove can provide an optical function, namely to minimize astigmatism caused by refraction of light as it passes from the otherwise flat surface of transparent substrate 104 through curved or cylindrical surface of cladding 122 of optical fiber 120. If the groove is fabricated to have a curved surface that matches the outer curvature of the outer surface of cladding 122 of optical fiber 120, then astigmatism otherwise caused by refraction between flat and curved surfaces can be largely mitigated. For example, a groove with such a curved surface can be provided in transparent substrate 104 by etching in hydrogen fluoride. Moreover, if the cross section of the groove does not perfectly match the curvature of the outer radius of the cladding 122 of optical fiber 120, thereby leaving an air gap between the transparent substrate 104 and the outer radius of optical fiber 120, the above-described refractive effect can be minimized by filling the groove with an index-matching material, such as a gel.

It is additionally possible to engineer or configure the surface of the transparent substrate 104, preferably the surface proximate to the optical fiber, to perform one or more optical functions such as focusing, collimating, or otherwise shaping the optical beam according to techniques known to persons having skill in the art. For example, a lens or diffractive grating can be formed on the surface of the transparent substrate 104 so as to improve the coupling efficiency between planar optical waveguide 102 and optical fiber 120. Moreover, an anti-reflection coating may be applied to a surface of the transparent substrate 104, thereby reducing the loss of optical power due to Fresnel reflection at the glass-air interface.

The design of grating coupler 106 is not limited to any particular design and, as will be shown in embodiments described below, can include grating couplers that redirect light at angles other than 90° relative to the propagation direction through planar optical waveguide 102 as shown by arrow 108. Grating couplers that redirect light at angles other than 90°, for example as illustrated in FIGS. 5 and 6, can be configured to allow light to be redirected via total internal reflection by angled face 128. For example, gratings do not need to be restricted to second order gratings (which in addition to reflecting or transmitting light in its plane, primarily reflect light vertically at an angle of about 90° relative to its propagation direction through planar optical waveguide 102) but can include higher order gratings, such as third, fourth and fifth order gratings. Such higher order gratings are larger in pitch size or period as compared to second order gratings and, as a consequence, they can reflect light at angles other than about 90° relative to its propagation through planar optical waveguide 102. For example, third order gratings can redirect light upwards or downwards at angles of about 60° and 120° relative to its propagation through planar optical waveguide 102. Gratings can also include those that are polarization sensitive and grating coupler 106 can, therefore, be used to polarize light being transmitted between planar optical waveguide 102 and optical fiber 120.

In the embodiment illustrated in FIG. 1, first optical transmission component 110 does not have a substrate (or any solid material) on the opposite side of planar optical waveguide 102 as optical fiber 120. In the embodiment illustrated in FIG. 1, grating coupler 106 does not extend into transparent substrate 104.

In preferred embodiments, transparent substrate 104 has sufficient thickness to provide the mechanical support, fiber positioning, and protection as described above. Preferably, transparent substrate 104 has a thickness of at least 100 such as a thickness of between 100 µm and 5000 µm. More preferably, transparent substrate 104 has a thickness of at least 200 µm, such as of between 200 µm and 2000 µm, and further such as a thickness of between 500 µm and 1000 µm.

Figure 2:
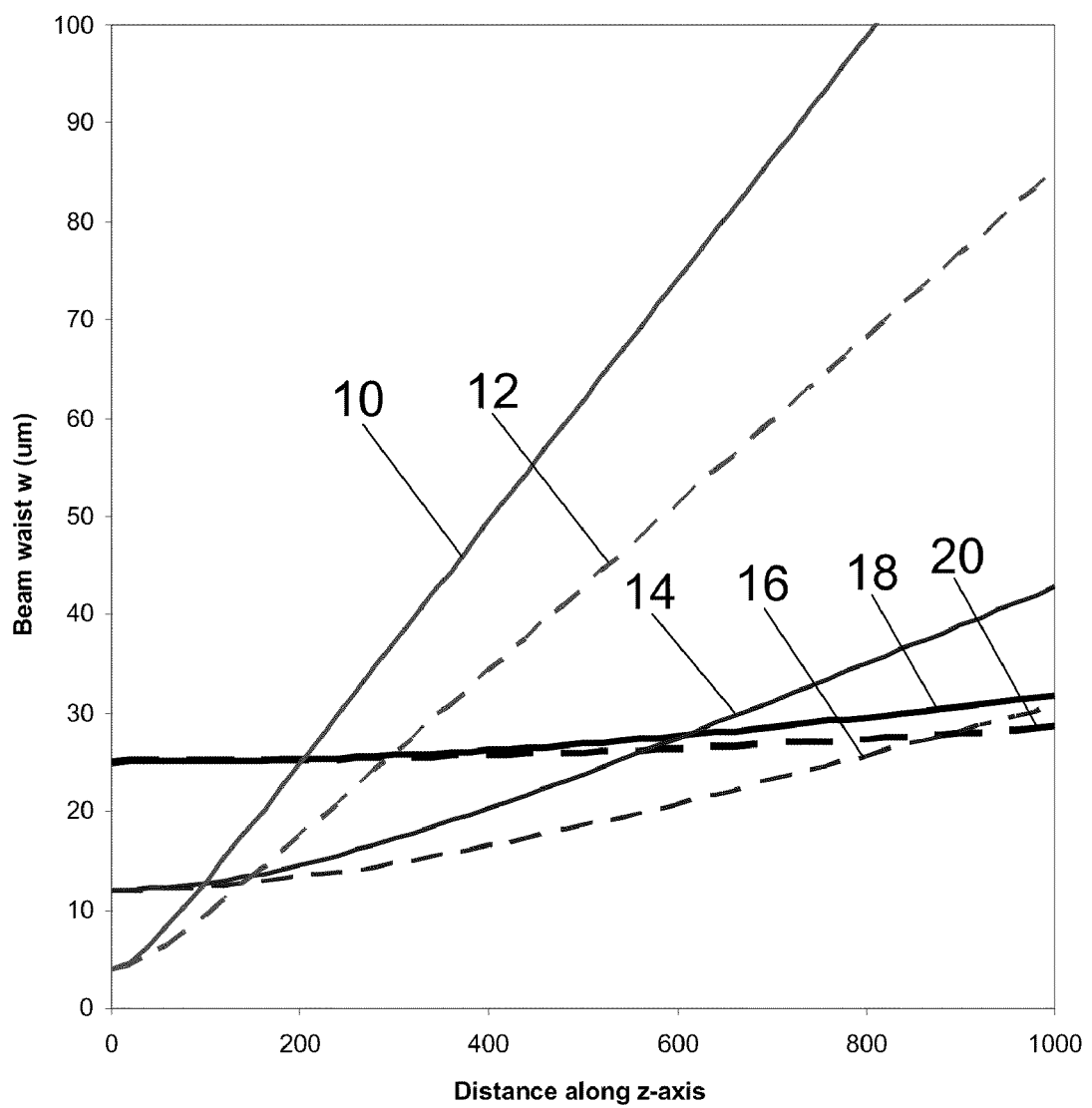
FIG. 2 plots light beam diffraction in air and glass for beam sources having differing widths.

In this regard, the use of glass as a transparent substrate 104 helps reduce beam diffraction during propagation as compared to propagation in air, thereby allowing for greater distances between grating coupler 106 and optical fiber 120 and, in turn, enabling the use of a thicker transparent substrate 104 with better mechanical properties. FIG. 2 shows how grating coupler derived optical beams of different widths and each having a wavelength, λ, of 1.55 µm, diffract as they propagate through air (refractive index, n=1.0) as compared to a glass substrate material (refractive index, n=1.45). Specifically, FIG. 2 shows beams having a waist of 8 µm propagated through air 10, a waist of 8 µm propagated through glass 12, a waist of 25 µm propagated through air 14, a waist of 25 µm propagated through glass 16, a waist of 50 µm propagated through air 18, and a waist of 50 µm propagated through glass 20. As can be seen from FIG. 2, beam propagation in glass allows for a greater amount of separation between a grating coupler and an outer surface of an optical fiber for a given amount of diffraction as compared to beam propagation in air. This enables thicker transparent substrates with improved mechanical strength for processing and use.

Embodiments disclosed herein, such as the embodiment illustrated in FIG. 1, can provide for optical coupling between planar optical waveguides and optical fibers that have the mechanical support, fiber positioning, and protection as described above while still achieving relatively low coupling loss between the planar optical waveguide and optical fiber. For example, embodiments disclosed herein can provide optical coupling between first optical transmission component 110 (comprising planar optical waveguide 102) and second optical transmission component (comprising optical fiber 120) wherein the coupling loss of optical radiation between the first optical transmission component and the second optical transmission component is less than 75%, such as less than 80%, and further such as less than 85%, and even further such as less than 90%.

Figure 3:
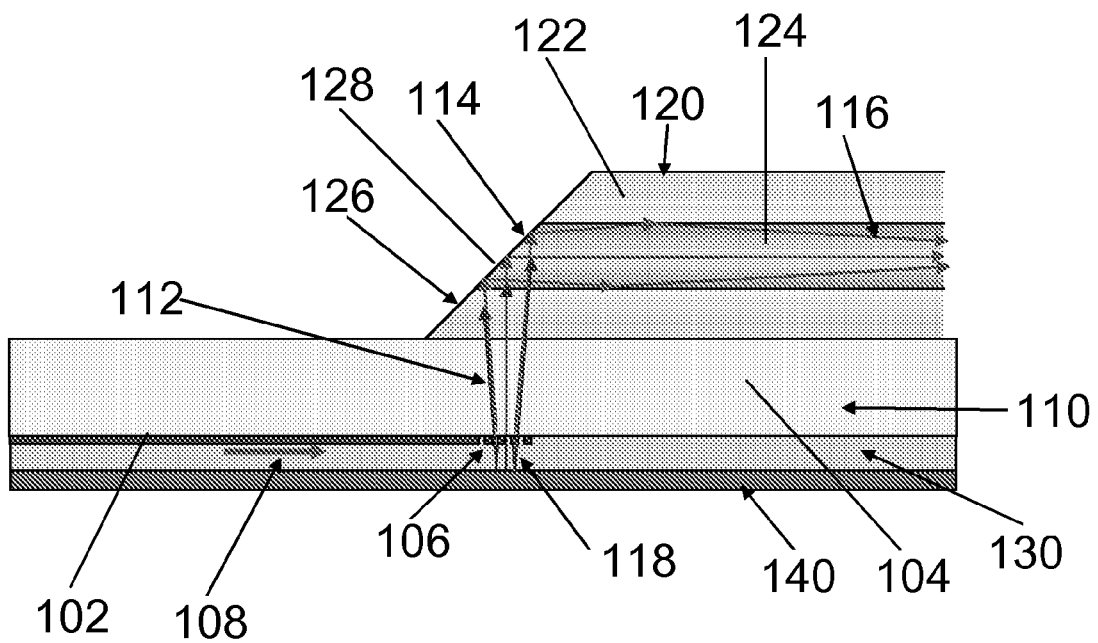
FIG. 3 illustrates a side cutaway view of another embodiment of a planar optical waveguide optically coupled to an optical fiber as described herein.

FIG. 3 illustrates a side cutaway view of an embodiment that is similar to the embodiment illustrated in FIG. 1 except that the first optical transmission component 110 further includes a buffer layer 130 and a layer having a reflective surface 140. As can be seen in FIG. 3, layer having reflective surface 140 is on the opposite side of planar optical waveguide 102 as optical fiber 120. The reflective surface faces buffer layer 130 and acts as a reflector to redirect light that is initially directed toward reflective surface by grating coupler 106 toward transparent substrate 104 and optical fiber 120, as indicated by arrows 118. Preferred materials for layer having reflective surface 140 include materials used for making dielectric stacks, such as $SiO_2$, $TiO_2$, $Al_2O_3$, $Ta_2O_5$, $MgF_2$, $LaF_3$, and $AlF_3$. Materials in addition to these may also be suitable, depending on the wavelength of operation. Layer having reflective surface 140 may also include metallic materials such as gold, silver, aluminum or any other surface with a high power reflection coefficient at the desired wavelength of operation.

Preferred materials for buffer layer 130 can include any glass, glass-ceramic, crystalline or polymer material that is relatively transparent in the wavelength of operation. Examples of preferred materials for buffer layer 130 include silica, doped silica glass, chalcogenite class, calcium fluoride, magnesium fluoride, and other specialty transparent glasses. Preferred materials for buffer layer 130 may also include silicon nitride, silicon oxynitride, and polymers, such as Su-8, poly(methyl methacrylate) (PMMA), or polyimide.

Figure 4:
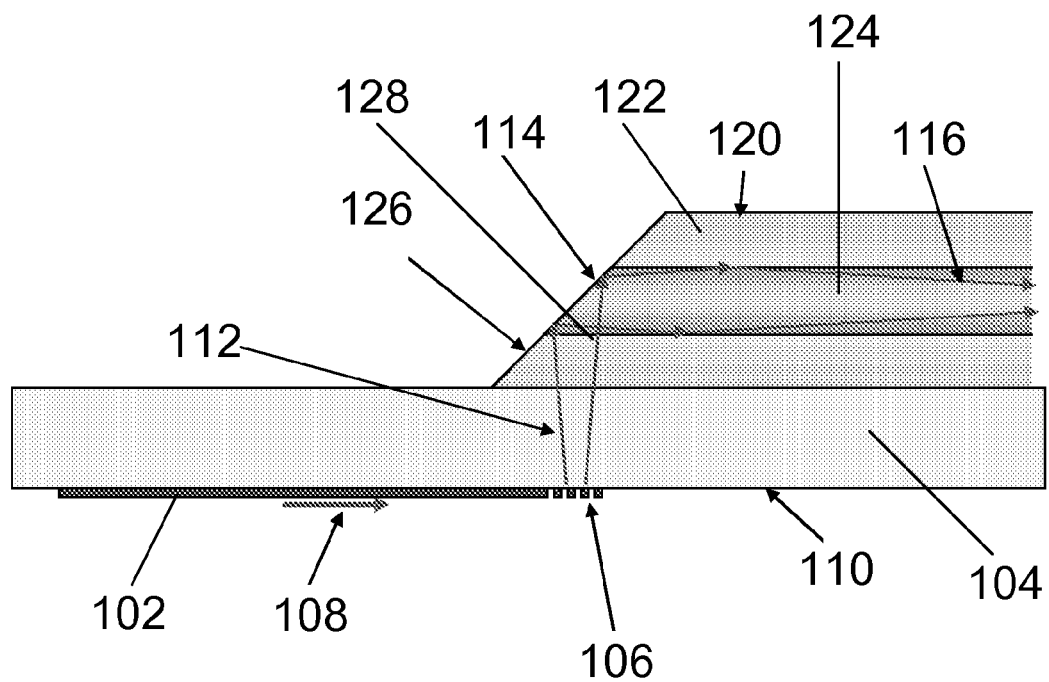
FIG. 4 illustrates a side cutaway view of another embodiment of a planar optical waveguide optically coupled to an optical fiber as described herein.

FIG. 4 illustrates a side cutaway view of another embodiment that is similar to the embodiment illustrated in FIG. 1 except that grating coupler 106 is patterned to redirect light toward optical fiber 120 in non-Gaussian beam shapes. In the embodiment illustrated in FIG. 4, optical fiber 120 is preferably a multimode fiber and the grating coupler 106 is configured to filter out at least one mode between first optical transmission component 110 and optical fiber 120 acting as second optical transmission component. In a particularly preferred embodiment, grating coupler 106 is patterned to preferentially excite a subset of the modes supported by the multimode fiber, said subset of modes having a smaller differential mode delay, resulting in improved link bandwidth performance. An example of such a grating coupler is one that redirects light in an annular ring beam pattern.

FIG. 5 illustrates a side cutaway view of another embodiment wherein grating coupler 106 redirects light to couple optical fiber 120 through angled face 128, as shown by arrows 112. In the embodiment illustrated in FIG. 5, angle, A, between the normal to angled face 128 of angled tip 126 and the longitudinal axis of optical fiber 120 is greater than 45°, such as at least 50°, and further such as at least 60°, and yet even further such as at least 70°, including from 50° to 75°. Such larger acute angles allow light beams (as shown by arrows 112) to be refracted into angled face 128 and guided into fiber (as shown by arrows 116). Preferably, an angle between the longitudinal path of planar optical waveguide 102 (along which light may travel as indicated by arrow 108) and light being transmitted (as indicated by arrows 112) between first optical transmission component 110 and optical fiber 120 acting as second optical transmission component is at least 120°, such as at least 130°, and further such as at least 140°, including from 120° to 150°.

In addition, an acute angle, A, of larger than 45°, enables a more durable fiber end face that should be more resistant to breakage on insertion to a connector assembly than a similar fiber with end face angles of 45° or less. Angled tip 126, including angled face 128, may be fabricated, for example, by laser cleaving methods or by precision mechanical fiber cleaving methods known to those skilled in the art.

In preferred embodiments corresponding to FIG. 5, angled face 128 may be coated with an anti-reflective material such as a dielectric stack or coating layer designed to mitigate reflections in order to minimize back reflections and scattering loss at angled face 128. Alternatively, reflection losses can be minimized by configuring the grating coupler 106 and angle, A, so that beams (shown by arrows 112) impinging on angled face 128 are at or near the Brewster angle. Notably, for Brewster-angle incidence to result in minimized reflection loss, beams (shown by arrows 112) impinging on angled face 128 should be polarized with the electric field in the plane of FIG. 5, which corresponds to a mode where the light resembles a transverse magnetic (TM) field polarization in the first optical transmission component 110.

The embodiment illustrated in FIG. 5, can allow for grating coupler designs where the required period of the grating is lower. Such coupling configurations can also provide increased tolerance for axial misalignment between optical fiber 120 and transparent substrate 104. For example, angled tip 126 may be pushed up against a fiber stop (not shown) that limits the travel of optical fiber 120 within the tolerances of the coupling configuration.

FIG. 6 illustrates a side cutaway view of another embodiment wherein light is directed from grating coupler 106, through transparent substrate 104 at a first angle (as shown by arrows 112A), and then directed from surface of transparent substrate 104 proximate to optical fiber 120 through angled face 128 at a second angle (as shown by arrows 112B). Similar to the embodiment illustrated in FIG. 5, angle, A, between the normal to angled face 128 of angled tip 126 and the longitudinal axis of optical fiber 120 is greater than 45°, such as at least 50°, and further such as at least 60°, and yet even further such as at least 70°, including from 50° to 75°. Preferably, an angle between the longitudinal path of planar optical waveguide 102 (along which light may travel as indicated by arrow 108) and light being directed through transparent substrate (as indicated by arrows 112A) is at least 100°, such as at least 110°, including from 100° to 120°. Preferably, an angle between the longitudinal path of planar optical waveguide 102 and light being transmitted (as indicated by arrows 112B) between first optical transmission component 110 and optical fiber 120 acting as second optical transmission component is at least 120°, such as at least 130°, and further such as at least 140°, including from 120° to 150°.

Similar to the embodiment illustrated in FIG. 3, first optical transmission component 110 further includes a buffer layer 130 and a layer having a reflective surface 140. As can be seen in FIG. 6, layer having reflective surface 140 is on the opposite side of planar optical waveguide 102 as optical fiber 120. The reflective surface faces buffer layer 130 and acts as a reflector to redirect light that is initially directed toward reflective surface by grating coupler 106 toward transparent substrate 104 and optical fiber 120, as indicated by arrows 118'. Preferred materials for layer having reflective surface 140 include materials used for making dielectric stacks, such as $SiO_2$, $TiO_2$, $Al_2O_3$, $Ta_2O_5$, $MgF_2$, $LaF_3$, and $AlF_3$. Materials in addition to these may also be suitable, depending on the wavelength of operation. Layer having reflective surface 140 may also include metallic materials such as gold, silver, aluminum or any other surface with a high power reflection coefficient at the desired wavelength of operation.

Preferred materials for buffer layer 130 can include any glass, glass-ceramic, crystalline or polymer material that is relatively transparent in the wavelength of operation. Examples of preferred materials for buffer layer 130 include silica, doped silica glass, chalcogenite class, calcium fluoride, magnesium fluoride, and other specialty transparent glasses. Preferred materials for buffer layer 130 may also include silicon nitride, silicon oxynitride, and polymers, such as Su-8, poly(methyl methacrylate) (PMMA), or polyimide.

Figure 7:
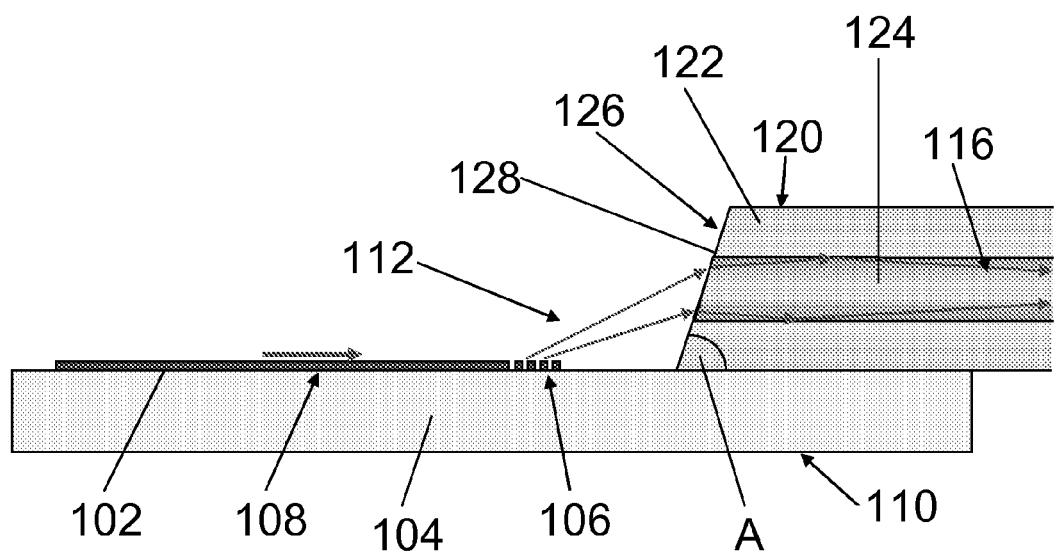
FIG. 7 illustrates a side cutaway view of another embodiment of a planar optical waveguide optically coupled to an optical fiber as described herein.

FIG. 7 illustrates a side cutaway view of another embodiment that is similar to the embodiment illustrated in FIG. 5 except that grating coupler 106 is patterned to redirect light toward optical fiber 120 in non-Gaussian beam shapes. In the embodiment illustrated in FIG. 7, optical fiber 120 is preferably a multimode fiber and the grating coupler 106 is configured to preferentially excite only a subset of the modes supported by the multimode fiber. In a particularly preferred embodiment, grating coupler 106 is patterned to preferentially redirect only higher order modes for improved link bandwidth performance. An example of such a grating coupler is one that redirects light in an annular ring beam pattern. Alternatively, the grating coupler 106 can be configured to redirect light in the reverse direction (i.e., to couple light from optical fiber 120 to planar optical waveguide 102). In preferred embodiments, wherein the grating coupler 106 is configured to couple light from optical fiber 120 to planar optical waveguide 102, grating coupler 106 is patterned to preferentially couple to the waveguide only a subset of the modes supported by the optical fiber.

Figure 8:
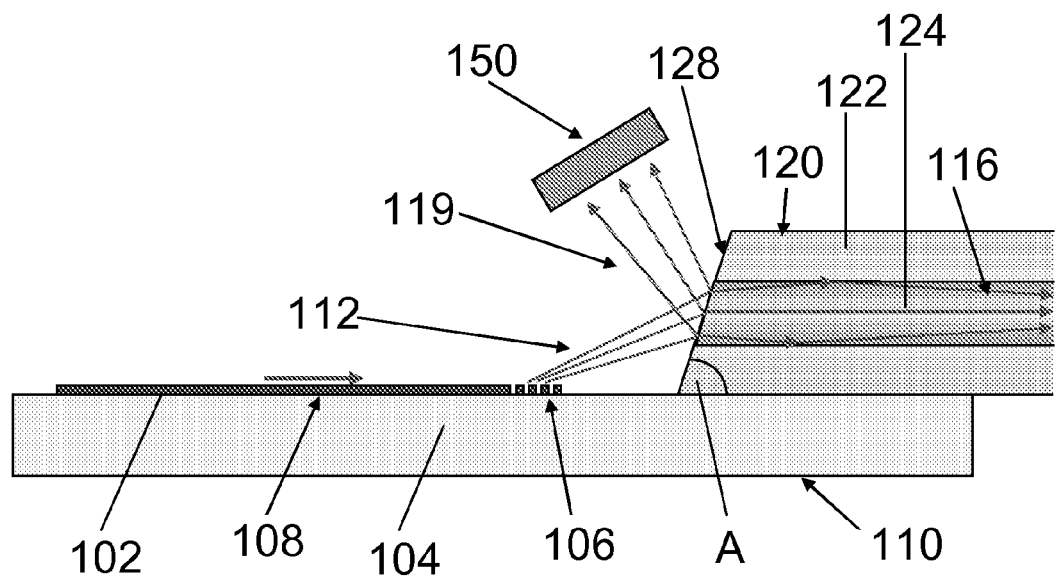
FIG. 8 illustrates a side cutaway view of another embodiment of a planar optical waveguide optically coupled to an optical fiber as described herein.

FIG. 8 illustrates a side cutaway view of another embodiment that is similar to the embodiment illustrated in FIG. 5 except a detector 150 is provided to detect light (indicated by arrows 119) reflected off of angled face 128 of angled tip 126. Detector preferably includes a photodiode that is selected based on the wavelength of operation. Preferred examples of photodiodes include those selected from silicon, germanium, gallium arsenide, or indium gallium arsenide. The embodiment illustrated in FIG. 8 can be used to actively monitor the power launched into optical fiber 120 and may be desirable for configurations where optical fiber eye safety power limitations and laser source lifetime degradation effects mandate monitoring the optical power launched into the fiber.

Figure 9:
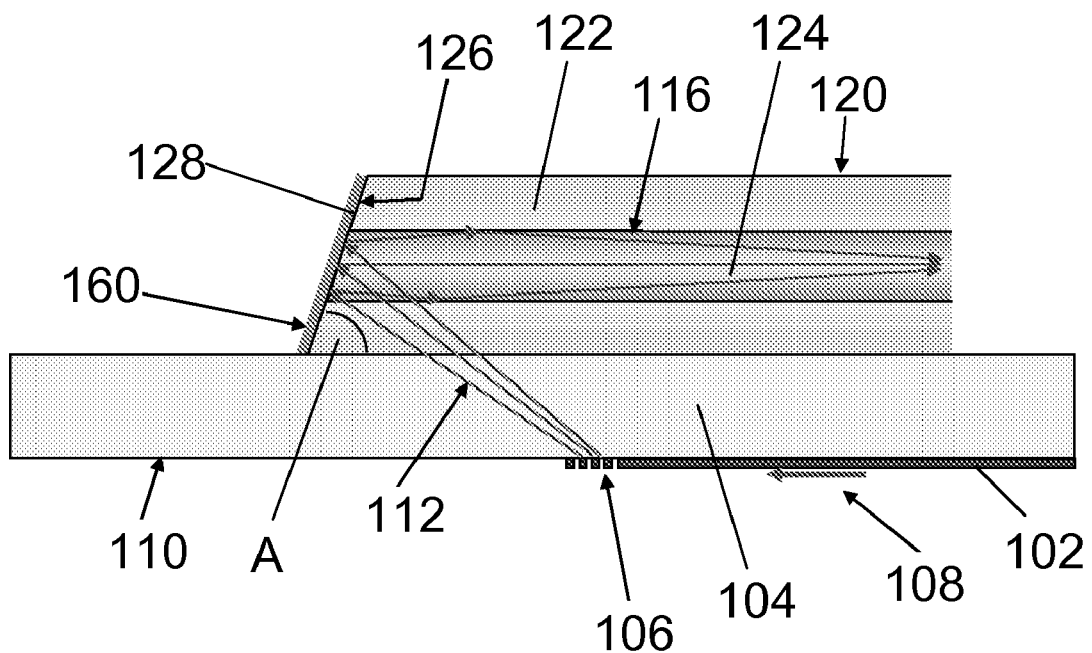
FIG. 9 illustrates a side cutaway view of another embodiment of a planar optical waveguide optically coupled to an optical fiber as described herein.

FIG. 9 illustrates a side cutaway view of another embodiment wherein a reflective material 160 is provided on angled face 128 of optical fiber 120. Light is directed from grating coupler 106, through transparent substrate 104 and reflected off of angled face 128 so that it is redirected along core 124 of optical fiber 120 as indicated by arrows 116. Similar to the embodiment illustrated in FIG. 5, angle, A, between the normal to angled face 128 of angled tip 126 and the longitudinal axis of optical fiber 120 is greater than 45°, such as at least 50°, and further such as at least 60°, and yet even further such as at least 70°, including from 50° to 75°. Preferably, an angle between the longitudinal path of planar optical waveguide 102 (along which light may travel as indicated by arrow 108) and light being transmitted (as indicated by arrows 112) between first optical transmission component 110 and optical fiber 120 acting as second optical transmission component is at least 120°, such as at least 130°, and further such as at least 140°, including from 120° to 150°.

Preferred materials for reflective material 160 include $SiO_2$, $TiO_2$, $Al_2O_3$, $Ta_2O_5$, $MgF_2$, $LaF_3$, and $AlF_3$. Materials in addition to these may also be suitable, depending on the wavelength of operation. Preferred materials for reflective material 160 may also include metallic materials such as gold, silver, aluminum or any other surface with a high power reflection coefficient at the desired wavelength of operation.

Figure 10:
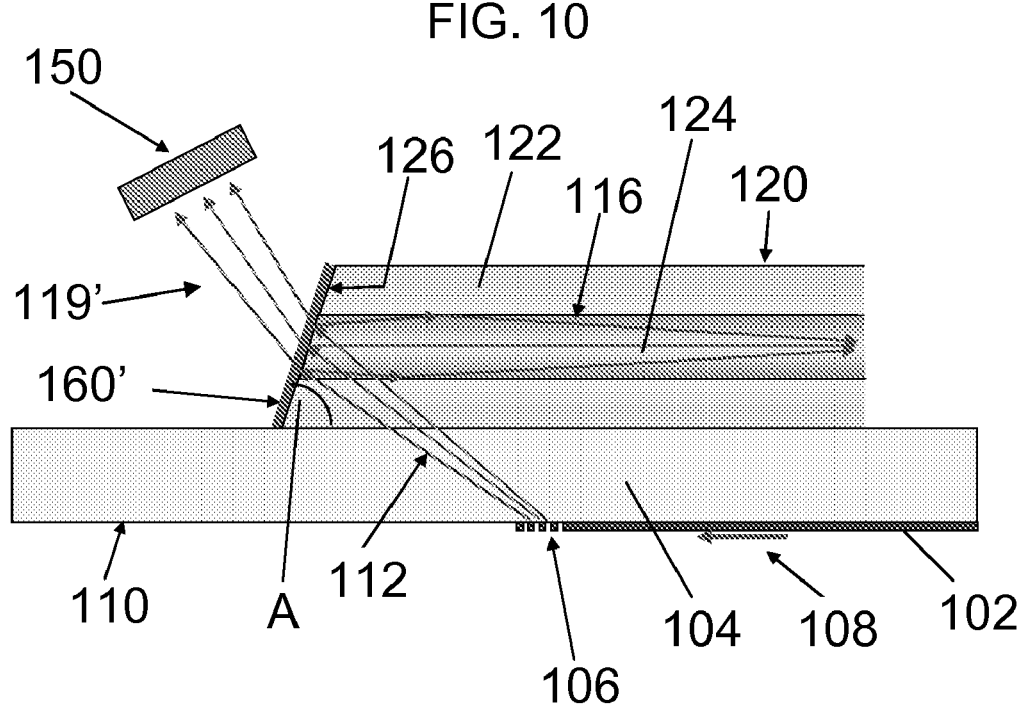
FIG. 10 illustrates a side cutaway view of another embodiment of a planar optical waveguide optically coupled to an optical fiber as described herein.

FIG. 10 illustrates a side cutaway view of another embodiment that is similar to the embodiment illustrated in FIG. 9 except that a partially reflective material 160' is provided on angled face 128 of optical fiber 120 and a detector 150 is provided to detect light (indicated by arrows 119') refracted off of angled face 128 of angled tip 126. Similar to the embodiment illustrated in FIG. 9, angle, A, between the normal to angled face 128 of angled tip 126 and the longitudinal axis of optical fiber 120 is greater than 45°, such as at least 50°, and further such as at least 60°, and yet even further such as at least 70°, including from 50° to 75°. Preferably, an angle between the longitudinal path of planar optical waveguide 102 (along which light may travel as indicated by arrow 108) and light being transmitted (as indicated by arrows 112) between first optical transmission component 110 and optical fiber 120 acting as second optical transmission component is at least 120°, such as at least 130°, and further such as at least 140°, including from 120° to 150°.

Preferred materials for partially reflective material 160' include materials that include those set forth above for reflective material 160 wherein the materials are, for example, applied as a thinner coating. Optionally, angled face 128 may not be coated with any material and still provide a partially reflective surface.

While FIGS. 1 and 3-10 show light propagating from the planar optical waveguide 102 to core 124 of optical fiber 120 through grating coupler 106, embodiments disclosed herein also include those in which light is propagated in the opposite direction (i.e., from core 124 of optical fiber 120 to planar optical waveguide 102 through grating coupler 106).

Embodiments disclosed herein are further clarified by the following nonlimiting example.

Example 1

Figure 11:
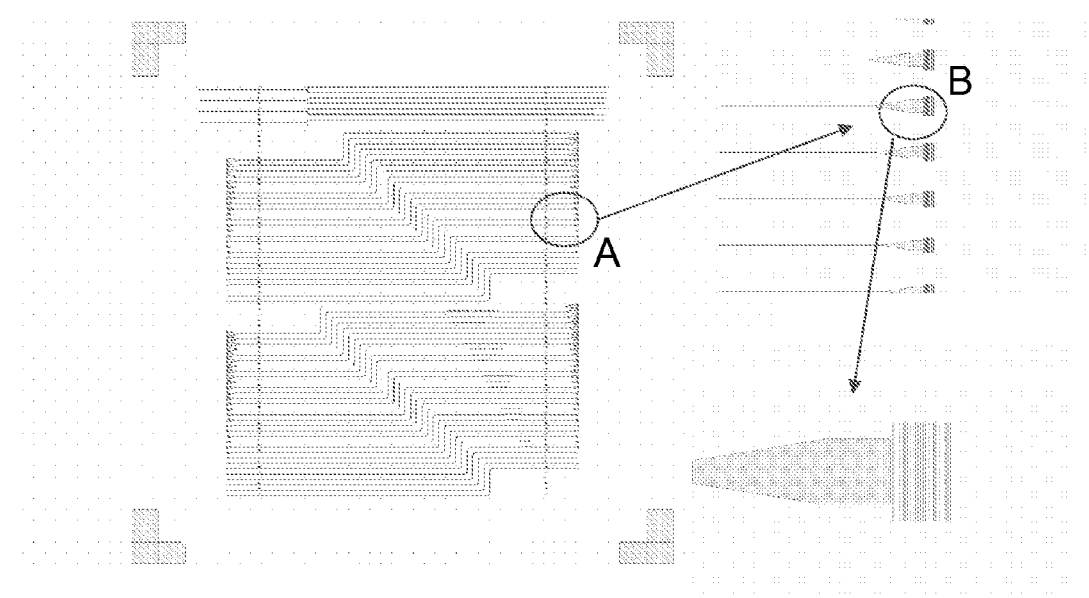
FIG. 11 illustrates a perspective view of silicon planar optical waveguides and grating couplers patterned on a glass substrate.

Silicon planar optical waveguides and grating couplers were patterned on a glass ($SiO_2$) substrate using deep ultraviolet (UV) lithography with a photolithographic tool operating at wavelengths of either 193 nm or 245 nm in the manner illustrated in FIG. 11, wherein the circled area A is shown blown up on the upper right hand side of the figure and the circled area B is shown blown up on the lower right hand side of the figure (the patterns illustrated in FIG. 11 may also be provided with an electron-beam writing system using electron beam sensitive photoresist or a focused-ion-beam system). The access section (i.e., the portion of the waveguide that is illustrated with a widening taper) of the grating couplers illustrated in FIG. 11 tapers from a width of 400 nm to a width of 3 μm over a length of 9 μm. The pitch of each grating coupler is approximately 1 μm and each silicon planar optical waveguides has an effective refractive index of about 1.551. The glass substrate had a thickness of about 625 μm and the silicon layer had a thickness of about 200 nm.

Figure 12A:
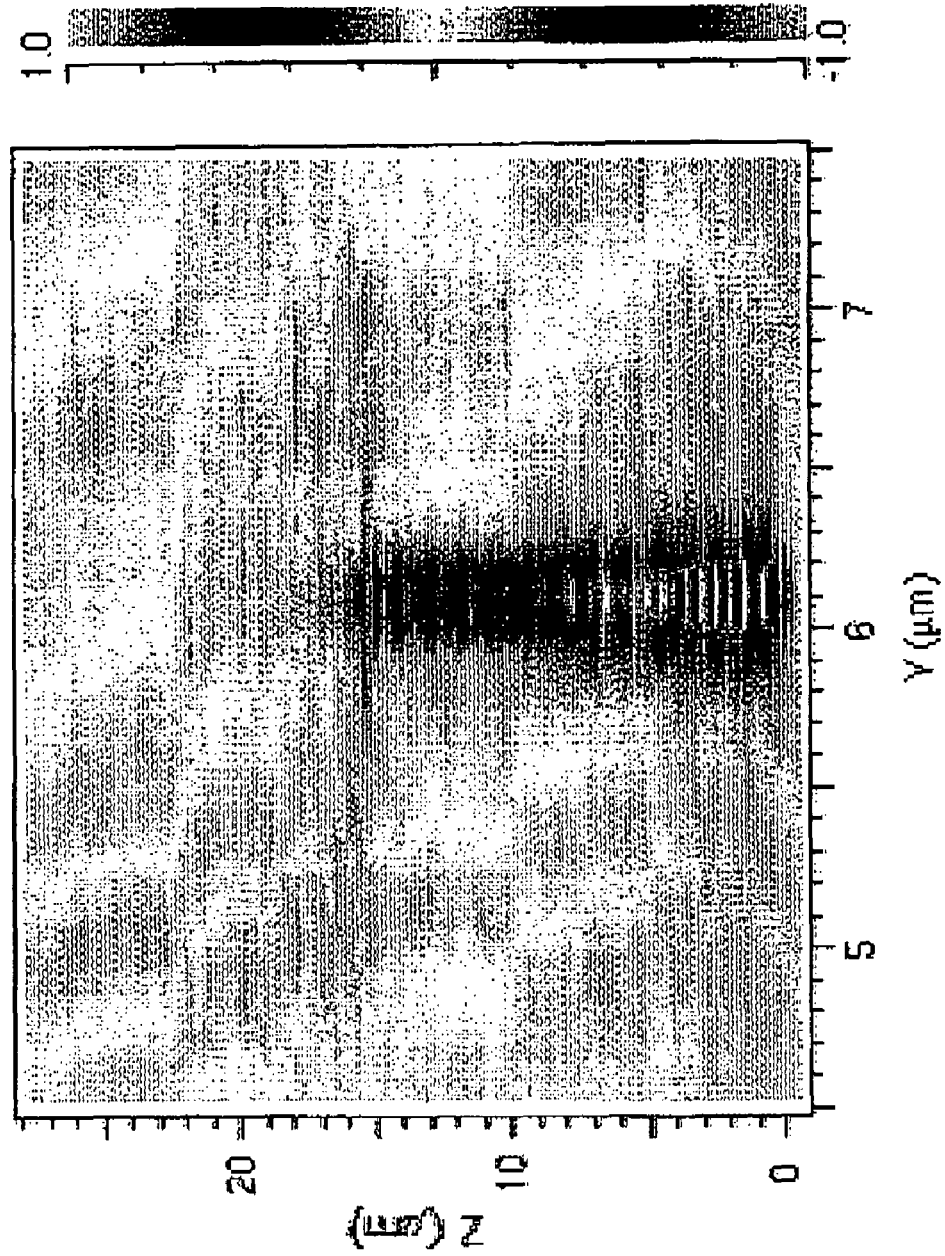
Figure 12B:
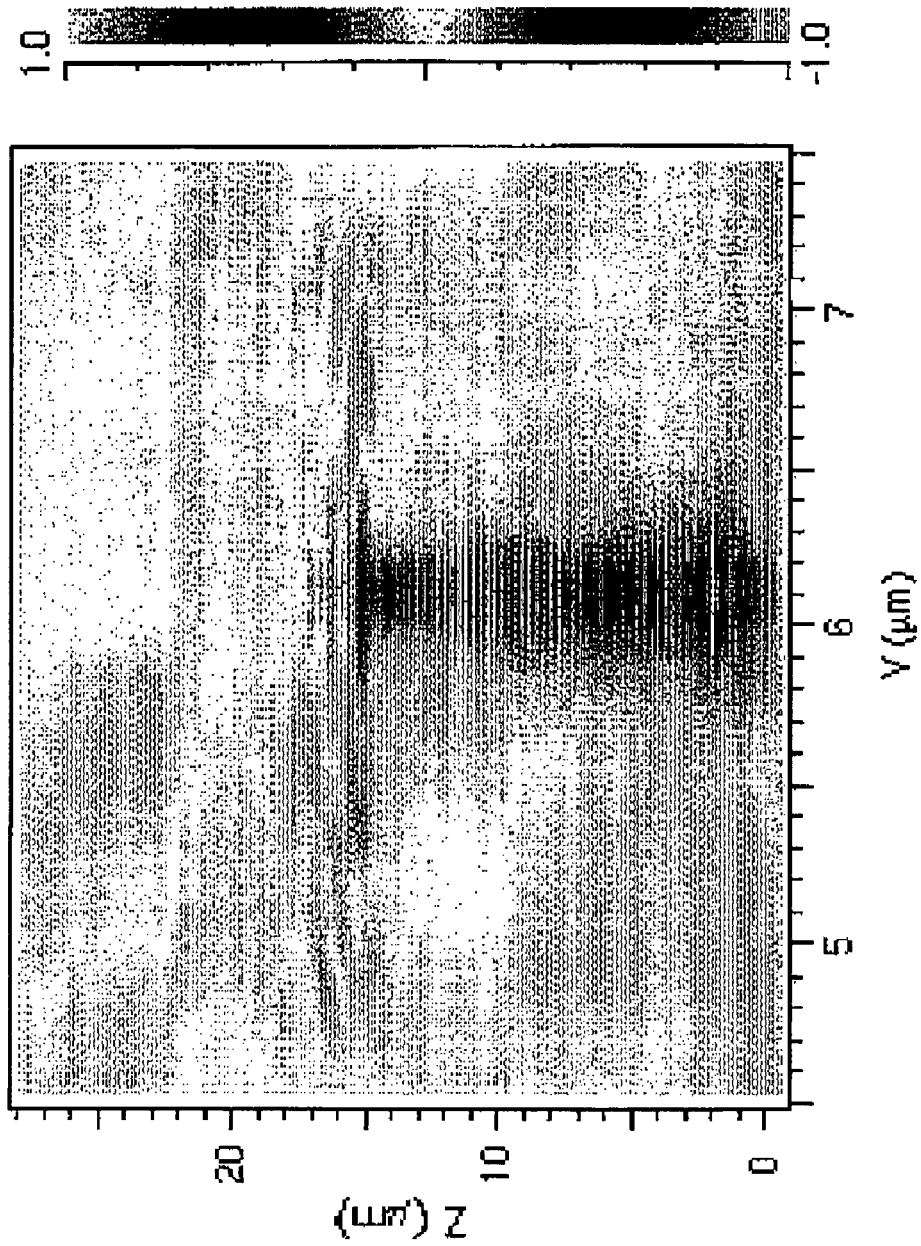

Three dimensional finite difference time domain (FDTD) simulations were carried out using the silicon on glass grating couplers illustrated in FIG. 11. Simulations were performed for three different wavelengths, $\lambda=1.40$ μm, $\lambda=1.50$ μm, and $\lambda=1.60$ μm as shown in FIGS. 12A-12C, respectively. Each of FIGS. 12A-12C shows a side view of the grating coupler electrical ($E_x$) field, with light shown entering on the left side of the figure and being diffracted in the vertical direction by the grating coupler (i.e., the Z-axis corresponds to the propagation direction along the silicon on glass waveguide and the Y-axis corresponds to the out-of-plane direction). As shown in each of FIGS. 12A-12C, the total length of the transverse electric (TE) mode generated by the grating coupler was about 12 μm. In addition, as shown in FIGS. 12A-12C, the vertical diffraction of the silicon on glass waveguide light by the grating coupler is not strongly wavelength dependent.

Figure 13:
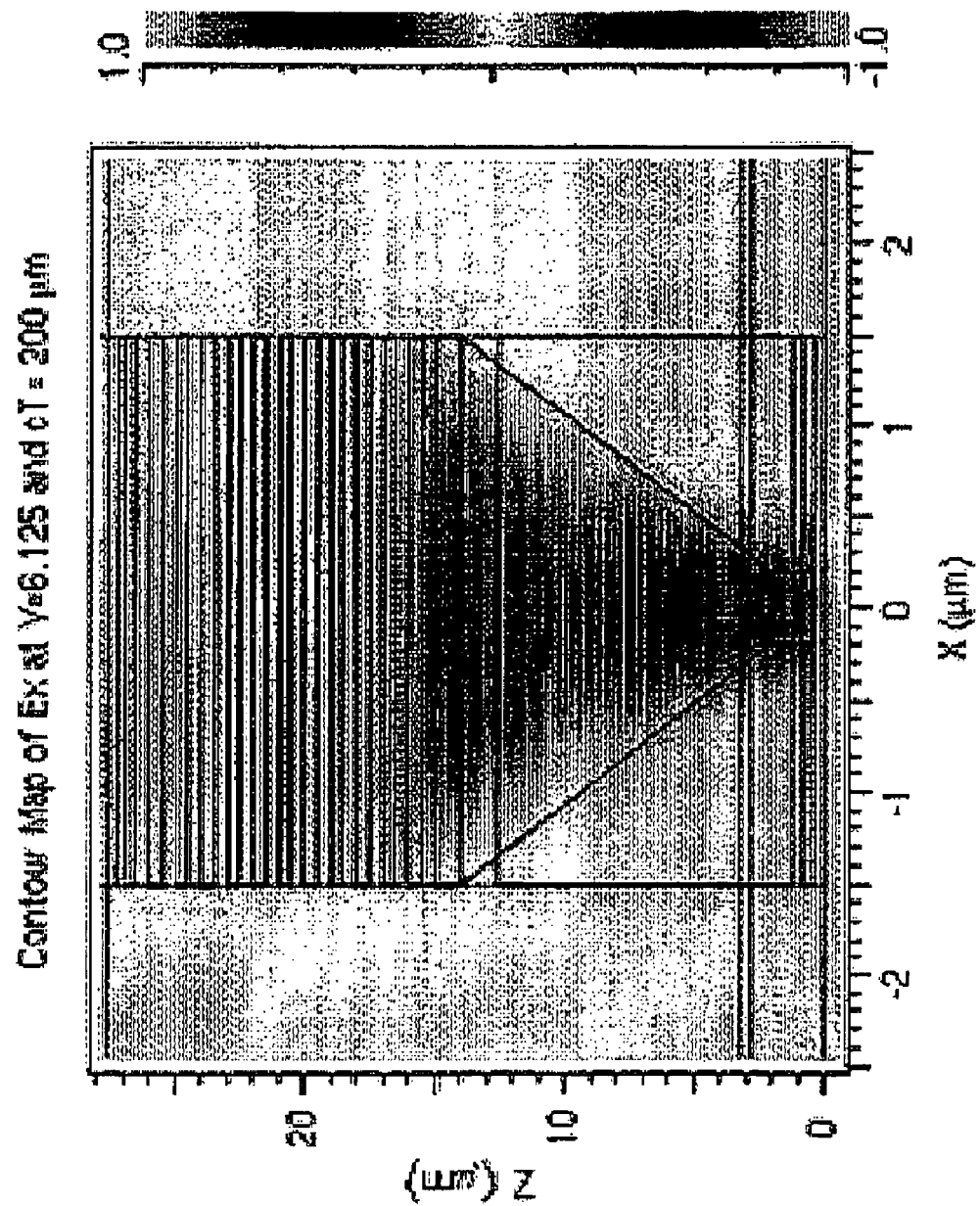
FIG. 13 illustrates a top view of an electrical field for a grating coupler illustrated in FIG. 11.

FIG. 13 shows a top view of an electrical ($E_x$) field of a grating coupler illustrated in FIG. 11 operating a wavelength, $\lambda=1.50$ μm (i.e., the surface plane of the silicon grating coupler on glass substrate lies in the X-Z plane of the plot). As is illustrated in FIG. 13, the widening taper of the $E_x$ field generally matches the widening taper of the grating coupler.

Figure 14:
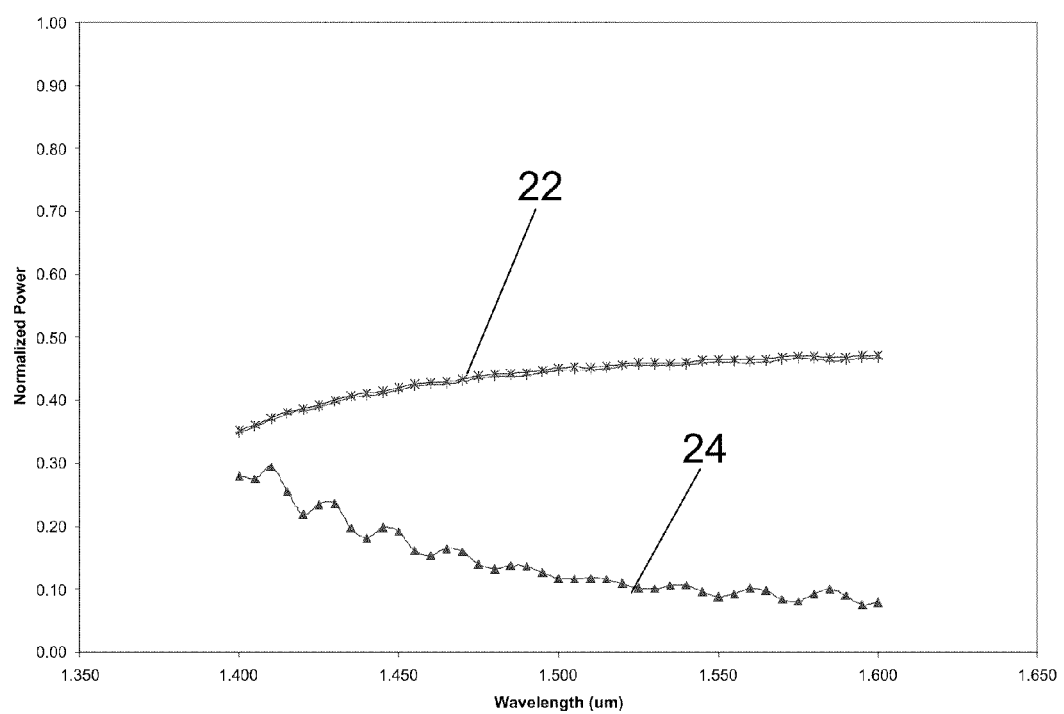
FIG. 14 plots simulated output power for a grating coupler illustrated in FIG. 11.

FIG. 14 plots simulated output power of the grating coupler illustrated in FIG. 11. As illustrated in FIG. 14, a significant amount of the power is expected to be diffracted in the vertical direction (i.e., upwards and downwards) 22 as compared to the power reflected 24 by the second order grating. In addition, performance is expected to be significantly broadband.

It will be apparent to those skilled in the art that various modifications and variations can be made without departing from the spirit and scope of the invention.

What is claimed is:

1. An apparatus for optically coupling light between optical transmission components, the apparatus comprising:
    a first optical transmission component comprising a planar optical waveguide extending along a longitudinal path, a grating coupler, and a transparent substrate, wherein the transparent substrate is disposed on a side of the planar optical waveguide and the grating coupler; and
    a second optical transmission component comprising an optical fiber, the optical fiber extending along a longitudinal axis and comprising a core and a cladding and having an angled tip, wherein the longitudinal axis of the optical fiber is substantially parallel to the longitudinal path of the planar optical waveguide; and wherein the transparent substrate is disposed between the planar optical waveguide and the optical fiber and coupling loss of optical radiation between the first optical transmission component and the second optical transmission component is less than 75%.

2. The apparatus according to claim 1, wherein the transparent substrate comprises glass and the planar optical waveguide comprises silicon.

3. The apparatus according to claim 1, wherein the transparent substrate has a thickness of at least 100 μm.

4. The apparatus according to claim 1, wherein the first optical transmission component does not have a substrate on the opposite side of the planar optical waveguide as the optical fiber.

5. The apparatus according to claim 1, wherein the optical fiber is a multimode optical fiber and the grating coupler is configured to preferentially excite only a subset of the modes supported by the multimode optical fiber.

6. The apparatus according to claim 1, wherein an angle between the normal to an angled face of the angled tip and the longitudinal axis of the optical fiber is at least 50°.

7. The apparatus according to claim 1, wherein an angle between the longitudinal path of the planar optical waveguide and a beam of light being transmitted between the first optical transmission component and the second optical transmission component is at least 120°.

8. The apparatus according to claim 1, wherein the first optical transmission component comprises a reflective surface on the opposite side of the planar optical waveguide as the optical fiber.

9. The apparatus according to claim 1, wherein an angled face of the angled tip comprises a surface selected from a reflective surface and a partially reflective surface.

10. The apparatus according to claim 1, wherein the apparatus further comprises a detector that is configured detect light reflected off of an angled face of the angled tip.

11. The apparatus according to claim 1, wherein the grating coupler does not extend into the transparent substrate.

12. The apparatus according to claim 1, wherein the transparent substrate comprises an alignment feature.

13. The apparatus according to claim 12, wherein the alignment feature comprises a groove.

14. The apparatus according to claim 13, wherein the groove is filled with an index matching material.

15. The apparatus according to claim 13, wherein the groove has a curved surface and the cladding of the optical fiber has an outer surface having an outer curvature, wherein the curved surface matches the outer curvature of the outer surface of the cladding.

16. The apparatus according to claim 1, wherein a surface of the transparent substrate proximate the optical fiber is configured as a lens or a diffractive grating.

17. A method of optically coupling light between optical transmission components, the method comprising:
    transmitting light between a first optical transmission component and a second optical transmission component, wherein:
    the first optical transmission component comprises a planar optical waveguide extending along a longitudinal path, a grating coupler, and a transparent substrate, wherein the transparent substrate is disposed on a side of the planar optical waveguide and the grating coupler; and
    the second optical transmission component comprises an optical fiber, the optical fiber extending along a longitudinal axis and comprising a core and a cladding and having an angled tip, wherein the longitudinal axis of the optical fiber is substantially parallel to the longitudinal path of the planar optical waveguide; and
    wherein light is transmitted between the planar optical waveguide, the grating coupler, and the core of the optical fiber; and wherein the transparent substrate is disposed between the planar optical waveguide and the optical fiber and coupling loss of optical radiation between the first optical transmission component and the second optical transmission component is less than 75%.

18. The method according to claim 17, wherein the transparent substrate comprises glass and the planar optical waveguide comprises silicon.

19. The method according to claim 17, wherein the optical fiber is a multimode optical fiber and the grating coupler preferentially excites only a subset of the modes supported by the multimode optical fiber.

20. The method according to claim 17, wherein an angle between the longitudinal path of the planar optical waveguide and a beam of light being transmitted between the first optical transmission component and the second optical transmission component is at least 120°.

21. The method according to claim 17, wherein the method further comprises detecting light reflected off of an angled face of the angled tip on a detector.

22. An apparatus for optically coupling light between optical transmission components, the apparatus comprising:
    a first optical transmission component comprising a planar optical waveguide extending along a longitudinal path, a grating coupler, and a transparent substrate, wherein the transparent substrate is disposed on a side of the planar optical waveguide and the grating coupler; and
    a second optical transmission component comprising an optical fiber, the optical fiber extending along a longitudinal axis and comprising a core and a cladding and having an angled tip, wherein the longitudinal axis of the optical fiber is substantially parallel to the longitudinal path of the planar optical waveguide; and wherein the optical fiber is a multimode optical fiber and the grating coupler is configured to preferentially excite only a subset of the modes supported by the multimode optical fiber.

23. The apparatus according to claim 22, wherein an angle between the normal to an angled face of the angled tip and the longitudinal axis of the optical fiber is at least 50°.

24. The apparatus according to claim 22, wherein an angle between the longitudinal path of the planar optical waveguide and a beam of light being transmitted between the first optical transmission component and the second optical transmission component is at least 120°.

25. The apparatus according to claim 22, wherein the first optical transmission component comprises a reflective surface on the opposite side of the planar optical waveguide as the optical fiber.

* * * * *